United States Patent
Burgess et al.

(10) Patent No.: US 11,704,092 B2
(45) Date of Patent: Jul. 18, 2023

(54) HIGH-PRECISION ANCHORED-IMPLICIT PROCESSING

(71) Applicant: Arm Limited, Cambridge (GB)

(72) Inventors: Neil Burgess, Cardiff (GB); Christopher Neal Hinds, Austin, TX (US); David Raymond Lutz, Austin, TX (US); Pedro Olsen Ferreira, Harlow (GB)

(73) Assignee: Arm Limited, Cambridge (GB)

(*) Notice: Subject to any disclaimer, the term of this patent is extended or adjusted under 35 U.S.C. 154(b) by 92 days.

(21) Appl. No.: 17/081,068

(22) Filed: Oct. 27, 2020

(65) Prior Publication Data
US 2022/0129245 A1   Apr. 28, 2022

(51) Int. Cl.
   *G06F 7/509*   (2006.01)
   *G06F 7/499*   (2006.01)
   *G06F 7/487*   (2006.01)

(52) U.S. Cl.
   CPC .......... *G06F 7/49947* (2013.01); *G06F 7/487* (2013.01); *G06F 7/509* (2013.01); *G06F 2207/3808* (2013.01); *G06F 2207/3832* (2013.01)

(58) Field of Classification Search
   CPC ....... G06F 7/49942; G06F 7/509–5095; G06F 9/30025; G06F 5/00; G06F 2205/003; G06F 2207/3808–382; G06F 2207/3832; G06F 2212/466
   See application file for complete search history.

(56) References Cited

U.S. PATENT DOCUMENTS

| | | | |
|---|---|---|---|
| 10,459,688 B1* | 10/2019 | Burgess | G06F 9/30014 |
| 10,579,338 B2 | 3/2020 | Hinds et al. | |
| 10,963,245 B2* | 3/2021 | Lutz | G06F 9/3001 |
| 2016/0124710 A1 | 5/2016 | Lutz et al. | |
| 2016/0126975 A1* | 5/2016 | Lutz | G06F 7/507 |
| | | | 708/204 |
| 2017/0139676 A1* | 5/2017 | Lutz | G06F 7/499 |
| 2018/0217815 A1* | 8/2018 | Hinds | G06F 17/16 |
| 2020/0249942 A1 | 8/2020 | Lutz et al. | |

OTHER PUBLICATIONS

Burgess, Neil; Fast and Correct Floating-Point Addition with High-Precision Anchored Numbers; Arm Research; Oct. 10, 2018; https://www.youtube.com/watch?v=slqgls0kH1c.
International Search Report and Written Opinion dated Feb. 1, 2022, issued in International Application No. PCT/GB2021/052729.
Burgess, Neil et al. High-Precision Anchored Accumulators for Reproducible Floating-Point Summation, IEEE Transactions on Computers, Jul. 2019, vol. 68, No. 7.
Lutz, David R. et al., High-Precision Anchored Accumulators for Reproducible Floating-Point Summation, 2017 IEEE 24th Symposium on Computer Arithmetic, 2017, pp. 98-105, IEEE Computer Society.

* cited by examiner

*Primary Examiner* — Matthew D Sandifer
(74) *Attorney, Agent, or Firm* — Quinn IP Law (57) ABSTRACT

An apparatus includes a processing circuit and a storage device. The processing circuit is configured to perform one or more processing operations in response to one or more instructions to generate an anchored-data element. The storage device is configured to store the anchored-data element. A format of the anchored-data element includes an identification item, an overlap item, and a data item. The data item is configured to hold a data value of the anchored-data element. The identification item indicates an anchor value for the data value or one or more special values.

20 Claims, 8 Drawing Sheets

HIGH-PRECISION ANCHORED-IMPLICIT PROCESSING

INTRODUCTION

The present disclosure relates to data processing, and in particular, to data processing with High-Precision Anchored-Implicit (HPAI) numbers with embedded anchor values.

It is common to use floating-point representations in data processing systems such as neural network and machine learning. A floating-point number includes a significand and an exponent indicating a significance of the bits of the significand. The floating-point format allows numeric values over a large range to be represented using a finite number of bits. However, dedicated hardware that processes the floating-point numbers is often complicated and typically slower than comparable hardware that processes integer-based numbers. To reduce the hardware issue, a "Brain floating-point format with 16 bits" (bfloat16) format was created that uses fewer bits than the single-precision IEEE-754 standard floating-point format. However, summations of the floating-point numbers are non-associative, meaning that different results are achieved when the floating-point numbers are added in different orders. For example, in computations involving bfloat16 values, $(2^4+2^{20})-2^{20}=(2^{20})-2^{20}=0$. In contrast, $2^4+(2^{20}-2^{20})=2^4+(0)=2^4=16$.

SUMMARY

An apparatus is provided herein. The apparatus includes a processing circuit and a storage device. The processing circuit is configured to perform one or more processing operations in response to one or more instructions to generate an anchored-data element. The storage device is configured to store the anchored-data element. A format of the anchored-data element includes an identification item, an overlap item, and a data item. The data item is configured to hold a data value of the anchored-data element. The identification item indicates an anchor value for the data value or one or more special values.

A method of controlling data processing is provided herein. The method includes controlling a processing circuit to perform one or more processing operations in response to one or more instructions to generate an anchored-data element, and storing the anchored-data element. A format of the anchored-data element includes an identification item, an overlap item, and a data item. The data item is configured to hold a data value of the anchored-data element. The identification item indicates an anchor value for the data value or one or more special values.

A non-transitory computer readable storage medium storing instructions that control data processing is provided herein. The instructions, when executed by a processor, cause the processor to perform a plurality of operations. The operations include controlling a processing circuit to perform one or more processing operations in response to the instructions to generate an anchored-data element, and storing the anchored-data element. A format of the anchored-data element includes an identification item, an overlap item, and a data item. The data item is configured to hold a data value of the anchored-data element. The identification item indicates an anchor value for the data value or one or more special values.

The above features and advantages and other features and advantages of the present disclosure are readily apparent from the following detailed description of the best modes for carrying out the disclosure when taken in connection with the accompanying drawings.

DETAILED DESCRIPTION

Embodiments of the present disclosure generally provide for an improved representation for High-Precision Anchored (HPA) numbers that enable metadata to be stored in a same operand register as the data. Storing the metadata and the data in a single operand register enables HPA-type multiply-accumulate instructions. The improvement modifies each operand to include an indication of an anchor value for the corresponding data. The improved representation may be referred to as High-Precision Anchored Implicit (HPAI) numbers and/or anchored-data elements.

An identification portion of an operand functions as a "lane identification" that enables several features that improve processing relative to accumulator circuits. The identification portions enable the data of the operand to be dynamically scaled as additional input values are accumulated. The dynamic scaling feature enables an accumulation to continue without external involvement and removes a task for a programmer to specify the anchor value in advance and the requirement to adjust it as the accumulation requires. The operands have implicit anchor values that are adjusted as the input values are accumulated.

The improved format retains overlap bits that enable multi-lane accumulation without carry propagation. The overlap bits increase accumulation throughput in cases of no change to the lane identification and a change to a lane identification. Embedding an indication of the anchor value for a data item within the operand simplifies the accumulation hardware. The simplified hardware is capable of performing the accumulation and modifying the lane identification value when the accumulation updates to a higher numerical range.

The various embodiments of the data item enable fast and simple hardware for computing dot products, often used in machine learning applications. The internal computational logic is physical size independent and not limited to the result data size. This provides for an internal computation of greater precision than the final result, increases the accuracy of the result to meet the precision demands of the application, and further enables the computational result to be any size, including 16 bits, 32 bits, 64 bits, or larger.

Figure 1:
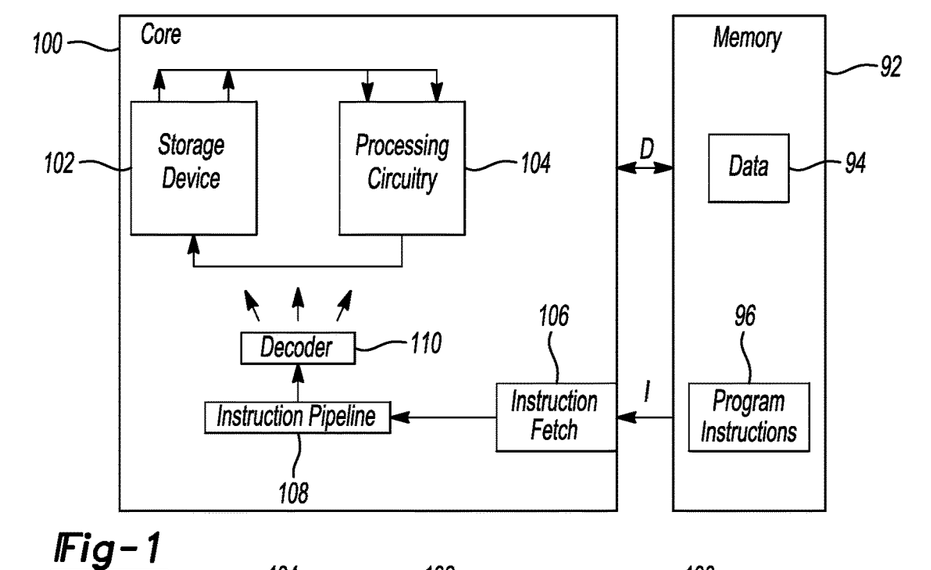
FIG. 1 is a schematic diagram illustrating a data processing device for performing data processing operations under control of program instructions in accordance with one or more exemplary embodiments.

Referring to FIG. 1, a schematic diagram illustrating a data processing device 90 for performing data processing operations under control of program instructions is shown in accordance with one or more exemplary embodiments. The data processing device 90 includes a storage element 92 and a processor core (or apparatus) 100. The storage element 92 is configured to store data 94 and program instructions 96. The processor core 100 includes a storage device 102, a processing circuit 104, an instruction fetch unit 106, an instruction pipeline 108, and a decoder 110. It will be appreciated that in practice the data processing device 90 may include many additional elements and that the representation of FIG. 1 is simplified to aid understanding.

A data signal (e.g., D) is exchanged between the storage element 92 and the processor core 100. The data signal D conveys the data 94 to be processed by the processor core 100 per the program instructions 96, and the result values generated by the processing. An instruction signal (e.g., I) is transferred from the storage element 92 to the processor core 100. The instruction signal I carries the program instructions 96 to be executed by the processor core 100.

The storage element 92 is implemented as one or more mass storage devices. The storage element 92 is coupled to the processor core 100. The storage element 92 is operational to store the data 94 and the program instructions 96. In various embodiments, the storage element 92 includes one or more memory cards, one or more solid-state drives, and/or one or more hard disk drives configured to communicate with the processor core 100 via the data signal D and the instruction signal I. Other forms of storage may be implemented in the storage element 92 to meet a design criteria of a particular application.

The processor core 100 is operational to execute the program instructions 96 to manipulate the data 94. The processing circuit 104 is configured to perform one or more processing operations in response to one or more of the program instructions 96 to generate an anchored-data element and store the anchored-data element. A format of the anchored-data element includes an identification item, an overlap item, and a data item. The data item is configured to hold a data value of the anchored-data element. The identification item indicates an anchor value for the data value or one or more special values.

In operation, the program instructions 96 are fetched from the storage element 92 by the instruction fetch unit 106 and supplied to the instruction pipeline 108. When the program instructions 96 reach the appropriate stage within the instruction pipeline 108 they are decoded by the decoder 110 and generate control signals that serve to control the operation of the storage device 102 and the processing circuit 104 to perform the processing operation(s) specified by the program instruction decoded. Multiple input operands may be read from the storage device 102 and supplied to the processing circuit 104 where the input operands are manipulated, and one or more subsequent result values are written back into the storage device 102.

The storage device 102 may be implemented in a variety of different forms. In various embodiments, the storage device 102 is implemented as register bank. The operands may, for example, include floating-point operands, fixed point operands, integer operands, HPA operands, and/or HPAI operands. The storage device 102 may serve to store a mixture of such types of operands depending upon the configuration of the storage device 102. The operands may have differing levels of precision, as may be predefined by their format, or as may be programmably specified using metadata associated with the registers. Additional details of the High-Precision Anchored operands may be found in U.S. Pat. No. 10,579,338, which is hereby incorporated by reference in its entirety.

Figure 2:
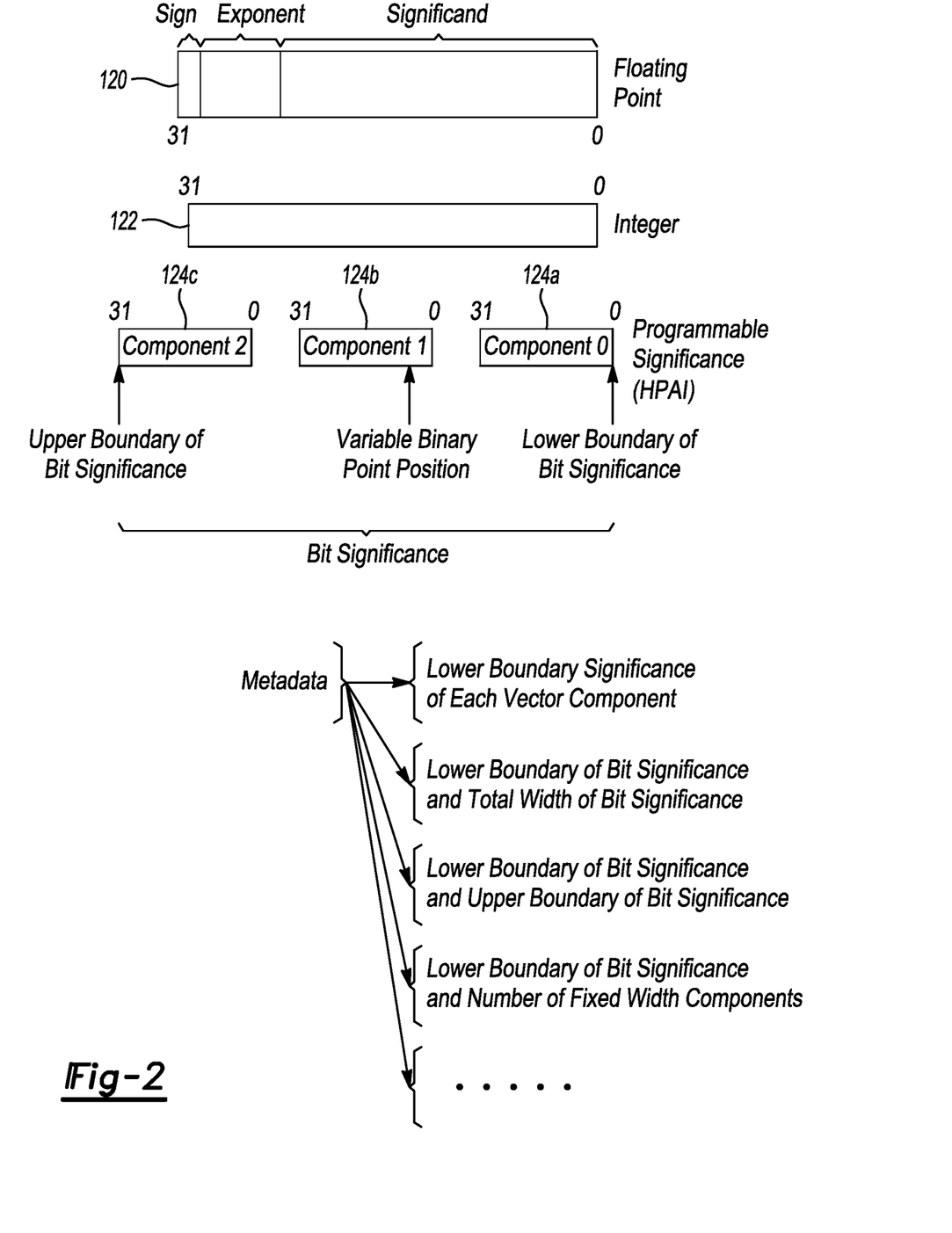
FIG. 2 is a schematic diagram illustrating various representations of numeric values in accordance with one or more exemplary embodiments.

Referring to FIG. 2, a schematic diagram illustrating various example representation of numeric values is shown in accordance with one or more exemplary embodiments. A single-precision floating-point operand 120 is formed of a sign, an exponent and a significand. The single-precision floating-point operand 120 has a predetermined size (e.g., [31:0]) and can represent values with a wide variety of magnitudes indicated by their exponent values. The precision with which a number can be represented is limited by the size of the significand. Floating-point operations typically are more complex and slower to implement than integer arithmetic.

A 32-bit integer operand 122 is also illustrated. The integer operand 122 as a predetermined size (e.g., [31:0]) and can represent numbers in the range of 0 to $2^{32}-1$ for unsigned integers or a range of $-2^{31}$ to $2^{31}-1$ for signed integers. Integer arithmetic is typically quick and consumes comparatively little energy to perform (compared with floating-point arithmetic), but suffers from the disadvantage that numbers of a comparatively limited range of values may be specified compared with the range of numbers which may be represented by a floating-point value.

Furthermore, a high-precision anchor-implicit (HPAI) operand is illustrated. The HPAI operand in the example comprises a vector of multiple anchored-data elements (in this example three) 124a-124c, each comprising a 32-bit integer in the example (e.g., [31:0]). The HPAI operand has associated metadata. The metadata is embedded within one or more of the anchored-data elements 124a-124c and includes an anchor value indicating a significance of the bits of the components forming parts of the HPAI number. The anchor value(s) specifies directly, or indirectly, a lower boundary of the bit significance and an upper boundary of the bit significance. The term metadata used herein may be considered to correspond to the data value(s), and may be used to specify the bit significance of an HPAI number. The different components together may be used to specify the bit values that contiguously span the range of bit significance. Depending upon the position of the lower boundary of the bit significance and the upper boundary of the bit significance, the range of bit significance may include the binary point position. It is also possible that the binary point position may lie outside of the range of bit significance specified for a particular high-precision anchor implicit value.

The anchor value(s) may be provided so that they are capable of representing a range of bit significance extending from a smallest significance that can be represented by a floating-point value (e.g., a single-precision FP value) up to a highest bit significance that can be represented by that floating-point value.

The number of components which form the high-precision anchor implicit number may vary among different implementations. The size of the components may be fixed in some embodiments, but in other embodiments may vary. An overall width of the range of bit significance may in some embodiments be constrained to change in units of a fixed component size (e.g., with 16-bit components, the range of the bit significance may have a width of, for example, 16, 32, 64, 128, 192, 256, . . . ). It is also possible that the width of the range of bit significance could vary continuously in steps of one bit width.

Embedding the anchor value(s) within the anchored-data element generally eliminates a manual task for a programmer to set and update the significance (e.g., the anchor value) of the corresponding HPAI value. The anchor value may specify the bit significance in a variety of different ways. An example is to specify the lower boundary bit significance of each vector component. Thus, each vector component may comprise an integer value representing its portion of the significant bits of the value within the overall range of bit significance together with metadata representing (anchoring) the significance of the lowest bit within that component. Another option is that the anchor value(s) specifies the lower boundary of the bit significance of the whole high-precision anchor implicit number together with the total width of the range of bit significance. A further option is that the anchor value(s) may comprise data specifying the lower boundary and the upper boundary of the range of bit significance. Still further variations are also possible, such as anchor value(s) comprising the lower boundary of the range of bit significance together with the number of the components where those components are known to be fixed width components.

Figure 3:
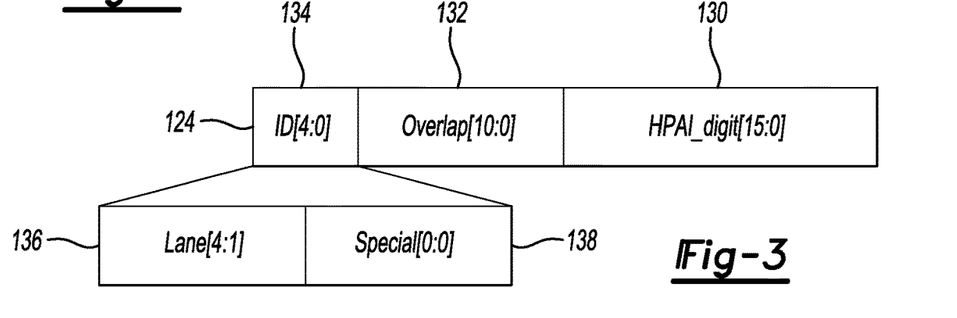
FIG. 3 is a schematic diagram of an anchored-data element in accordance with one or more exemplary embodiments.

Referring to FIG. 3, a schematic diagram of an example implementation of an anchored-data element 124 is shown in accordance with one or more exemplary embodiments. The anchored-data element 124 includes a data item 130, an overlap item 132, and an identification item 134. The identification item 134 includes a lane item 136 and a special item 138. In various embodiments, the anchored-data element 124 may be represented as an N-bit (e.g., 32-bit) binary string.

The data item 130 is configured to store a data value of the anchored-data element 124. The data item 130 is a D-bit (e.g., 16-bit) field within the anchored-data element 124, where D<N. In various embodiments, the data item 130 occupies the lower D bits of the anchored-data element 124.

The overlap item 132 is configured to provide extra bits within the anchored-data element 124 to store higher-precision data than can be held in the data item 130 alone. In some embodiments, the overlap item 132 is an 0-bit (e.g., 11-bit) field within the anchored-data element 124, where O<N. The overlap item 132 is used during addition/accumulation operations where the data within the data item 130 would otherwise overflow the boundaries of the data item 130.

The lane item 136 is configured to store a lane identification value. In various embodiments, the lane item 136 is an L-bit (e.g., 4-bit) field with the identification item 134, where L<N. The lane identification value within the lane item 136 is an anchor value for the data value held in the data item 130 and the overlap item 132. The lane identification value provides the metadata that establishes a bit significance window of the data value.

The special item 138 is configured to store a bit (or flag) that determines when the rest of the bits in the identification item 134 are the identification value or one of several possible special values. The special item 138 is an S-bit (e.g., 1-bit) field with the identification item 134, where S<N. In various embodiments, while the special item 138 holds a normal value (e.g., a logical zero value), the remaining bits in the identification item 134 are interpreted as the lane identification value. While the special item 138 holds a predetermined value (e.g., a logical one value), the remaining bits in the identification item 134 specifies that the anchored-data element 124 is one of a positive infinity, a negative infinity, not-a-number, and an overflow indication. Other combinations of the L-bits within the identification item 134 may be used to represent other special values to meet the design criteria of a particular application.

By combining the items 130-134 in a single N-bit element, the N-bit element may be loaded and stored in a single N-bit storage element (or register). As such, the processing circuit 104 of FIG. 1 is configured to access the identification item 134, the overlap item 132, and the data item 130 together in a single addressable location.

Figure 4:
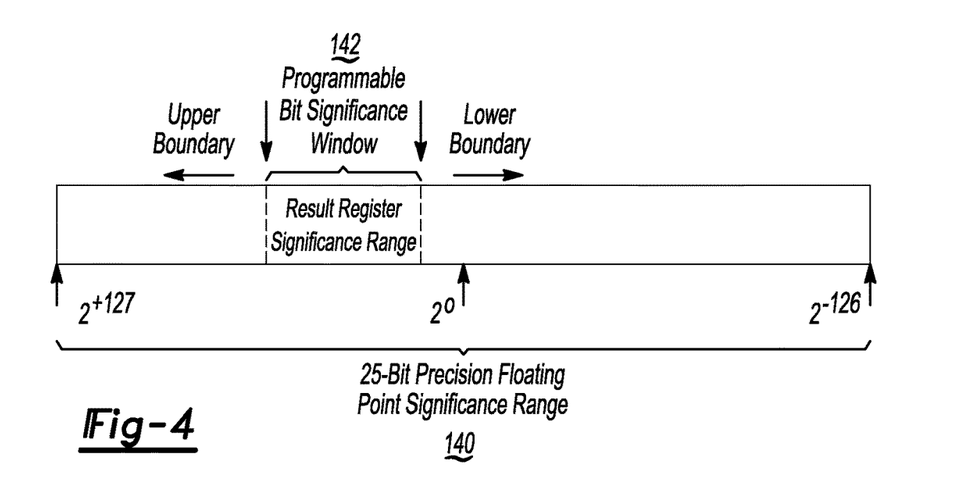
FIG. 4 is a schematic diagram that illustrates a relationship between a range of values representable with a single precision floating-point value and a significance range of the anchored-data element in accordance with one or more exemplary embodiments.

Referring to FIG. 4, a schematic diagram that illustrates a relationship between a range of values representable with a single precision floating-point value and an example significance range of the anchored-data element 124 of FIG. 3 is shown in accordance with one or more exemplary embodiments. In the case of a single precision floating-point number, a range 140 of bit values that may be specified generally extends from approximately to $2^{+127}$ to approximately $2^{-149}$. A bit significance window 142 of the anchored-data element 124 may reside anywhere within the range 140 while covering only a portion of the range 140. The bit significance window 142 may be programmable by a programmer to establish an initial range. The bit significance window 142 may also by automatically adjusted by the hardware manipulating the anchored-data element 124 as the data value held within exceeds the upper boundary of the window 142.

Figure 5:
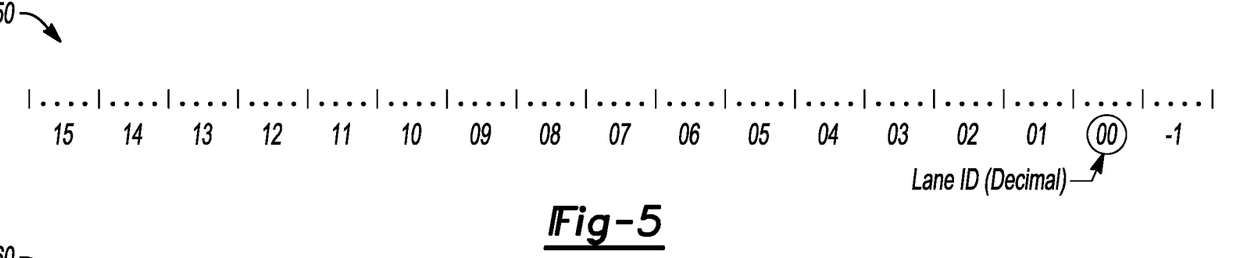
FIG. 5 is a schematic diagram of an accumulator in accordance with one or more exemplary embodiments.

Referring to FIG. 5, a schematic diagram of an example 288-bit HPAI accumulator 150 is shown in accordance with one or more exemplary embodiments. The HPAI accumulator 150 may be viewed as a 17-lane accumulator (e.g., 15, 14, . . . , 0, −1) over a range of [+128:−142]. Each lane covers 16 bits of the accumulation. Lane 15 generally covers an accumulation[128:113], lane 14 covers an accumulation [112:97], and so on. Lane −1 is optionally used for least-significant bits of products with very small exponents (e.g., ≤−113). An implicit 11-bit overlap of adjacent lanes (not shown) exists where the overlap items 132 of one lane extends into the adjoining lane.

Mapping a bfloat16 number into the HPAI accumulator 150 involves a determination of the lane identification value for a corresponding anchored-data element 124. For 16-lanes, the lane identification value may be obtained as the 4 most significant bits of the bfloat exponent (e.g., exponent [7:4]). Thus, the bfloat16 product may be shifted right by ~exp[3:0] to be placed in the correct lane of the HPAI accumulator 150 (e.g., ~exp[3:0]==15(decimal) ~exp[3:0]). In the example illustrated, the lane identification value is zero (decimal).

Figure 6:
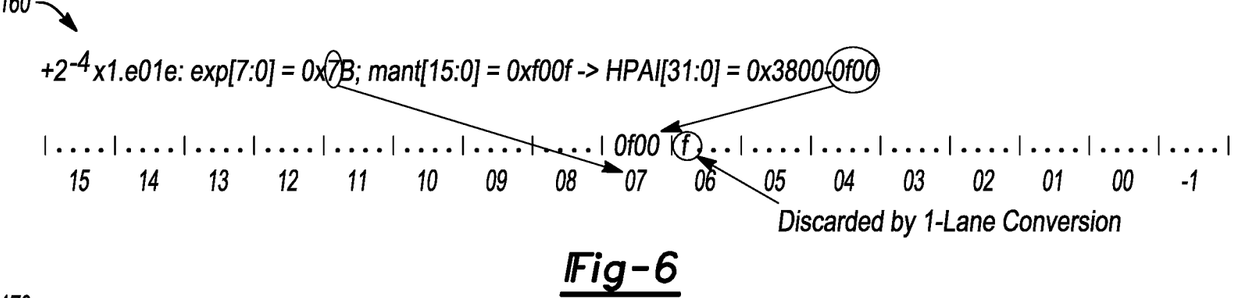
FIG. 6 is a schematic diagram of a first conversion of a bfloat16 number into the HPAI accumulator in accordance with one or more exemplary embodiments.

Referring to FIG. 6, a schematic diagram of a first example conversion 160 of a bfloat16 number into the HPAI accumulator is shown in accordance with one or more exemplary embodiments. The example value of $+2^{-4} \times 1.e01e$ results in an 8-bit bfloat16 exponent of 0x7B (hexadecimal). The 4 most significant bits (e.g., 0x7) of the exponent determine the lane identification value. A mantissa of 0xf00f (hexadecimal) is combined with an exponent to return an HPAI number corresponding to a 32-bit value of 0x38000f00 (hexadecimal). The data item 130 of the anchored-data element 124 (HPAI) can hold 16 bits of the fraction (e.g., 0x0f00). Therefore, the 12 bits (e.g., 0xf00) from the original mantissa 0xf00f are left padded to 16 bits (e.g., 0x0f00) and assigned to lane 7, with the last 4 bits of the original mantissa (e.g., 0xf) being assigned to lane 6. For a one-lane conversion, the value in lane 6 is discarded (e.g., truncated). Negative products would set destination overlap region to all 1's (not shown).

Figure 7:
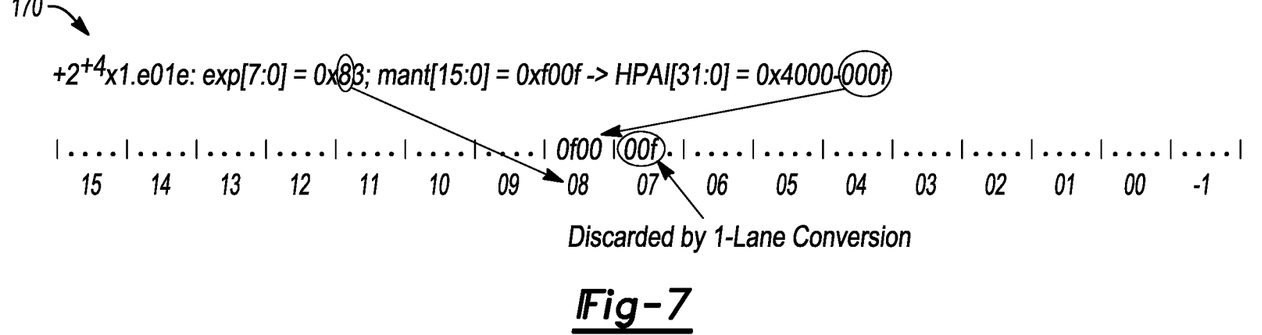
FIG. 7 is a schematic diagram of a second conversion of a bfloat16 number into the HPAI accumulator in accordance with one or more exemplary embodiments.

Referring to FIG. 7, a schematic diagram of a second example conversion 170 of a bfloat16 number into the HPAI accumulator is shown in accordance with one or more exemplary embodiments. Given an example value of $+2^{+4} \times 1.e01e$, an 8-bit bfloat16 exponent of 0x83 (hexadecimal). The 4 most significant bits (e.g., 0x8) of the exponent determine the lane identification value. A mantissa of 0xf00f (hexadecimal) is combined with an exponent to return an HPAI number corresponding to a 32-bit value of 0x4000000f (hexadecimal). The data item 130 of the anchored-data element 124 (HPAI) can hold 16 bits of the fraction (e.g., 0x000f). Therefore, the 4 bits (e.g., 0xf) from the original mantissa 0xf00f are left padded to 16 bits (e.g., 0x000f) and assigned to lane 8, with the last 12 bits of the original mantissa (e.g., 0x00f) being assigned to lane 7. For a one-lane conversion, the value in lane 7 is discarded (e.g., truncated).

Figure 8:
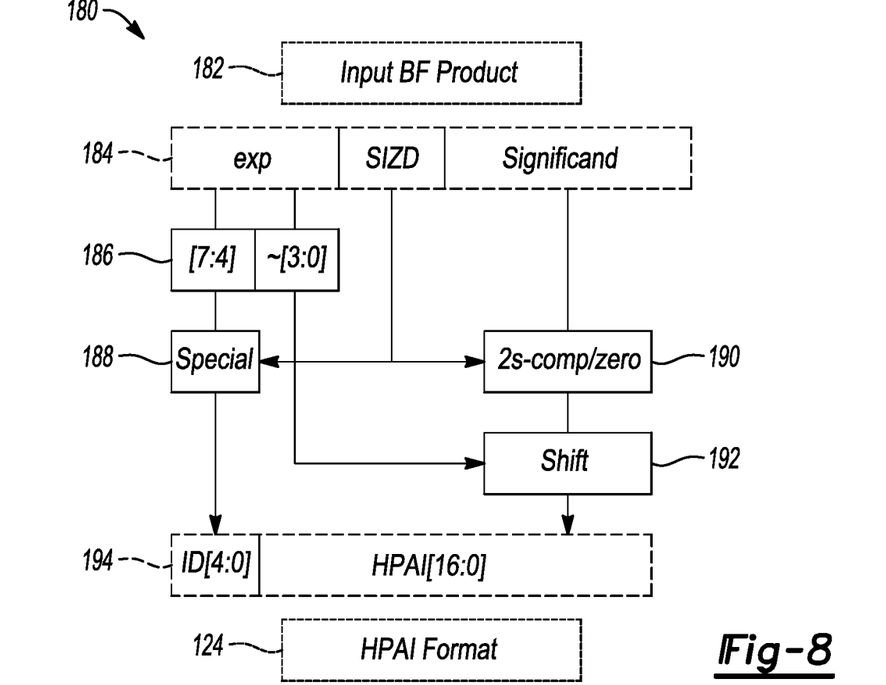
FIG. 8 is a schematic diagram of a conversion datapath from a bfloat16 value to an anchored-data element in accordance with one or more exemplary embodiments.

Referring to FIG. 8, a schematic diagram of an example conversion datapath 180 from a bfloat16 value to an anchored-data element 124 is shown in accordance with one or more exemplary embodiments. The datapath 180 may be implemented in the processor core 100. An input bfloat16 (BF) product 182 may be received by the datapath 180. The datapath 180 includes a block 184, a block 186, a block 188, a block 190, a block 192, and a block 194.

The bfloat16 product is parsed at block 184 into the exponent, a significand, and a "SIZD" field. The SIZD field denotes one or more of Sign, Infinity, Zero, and Not-a-Number indicators. The exponent field is parsed at block 186 into the four most significant bits (e.g., [7:4]) and the four least significant bits (e.g., [3:0]).

At block 188, the SIZD field and the four most significant exponent bits are used to determine both the special value to be stored in the special item 138 and the lane identification value to be stored in the lane item 136 of the anchored-data element 124. The 16-bit bfloat16 product significand and the +sign bit of the SIZD field are converted into to a 17-bit 2's-complement number at block 190. An increment of the 2's-complement number may be deferred to a later addition/accumulation. Bit[16] of the HPAI number is sign-extended into the whole overlap region in the data item 130 before being accumulated. Bit[16] of the converted product specifies whether to increment or not. At block 192, the lower four bits of the bfloat16 exponential field are used to shift the 2's-complement number into the 16-bit size of the data item 130. In various embodiments, an order of the 2's-complement block 190 and the shifter block 192 may be reversed.

At block 194, the identification item 134 and the data item 130 are populated by the values determined by the blocks 188, 190 and 192. The overlap item 132 may be populated with all zero bits or all ones, depending on the sign of the converted bfloat product. At the end of the datapath 180, the bfloat16 product 182 is converted into an anchored-data element 124 suitable for use in the processing circuit 104 and/or elsewhere in the processor core 100.

Figure 9:
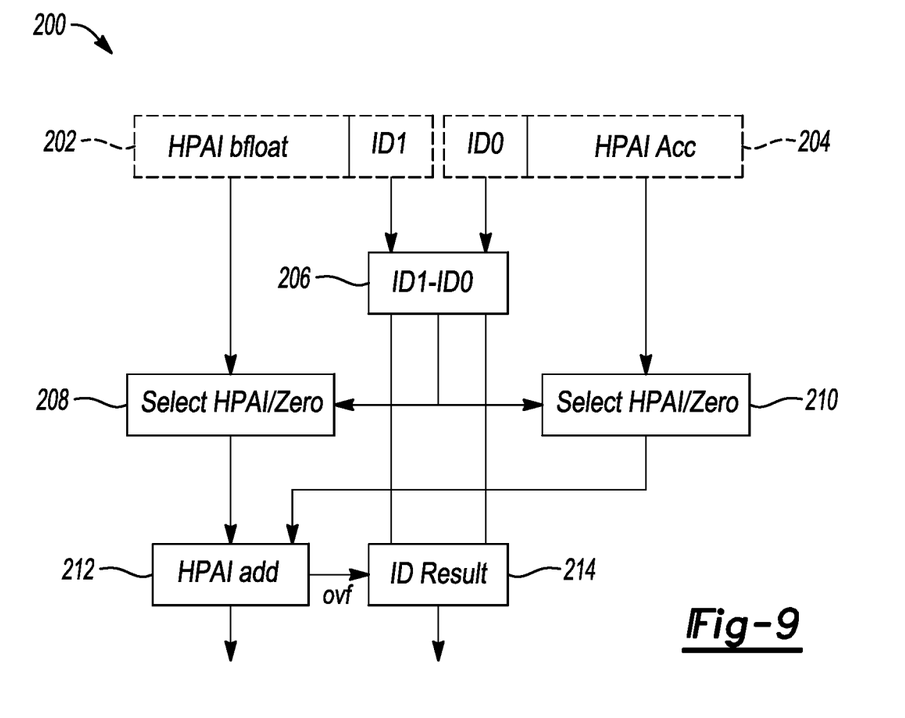
FIG. 9 is a schematic diagram of a single-lane HPAI accumulation datapath in accordance with one or more exemplary embodiments.

Referring to FIG. 9, a schematic diagram of an example single-lane HPAI accumulation datapath 200 is shown in accordance with one or more exemplary embodiments. The datapath 200 may be implemented in the processor core 100. The datapath 200 includes a block 202, a block 204, a block 206, a block 208, a block 210, a block 212, and a block 214. The datapath 200 example as illustrated generally adds a 5+17-bit HPAI bfloat product to a 5+27-bit HPAI accumulator product.

In the block 202, a bfloat16 product recently converted to an anchored-data element 124 is parsed into 17 bits of new data (e.g., HPAI bfloat) and 5 bits of the identification value (e.g., ID1). In the block 204, an accumulated data currently in the accumulator may be parsed into 27 bits of accumulated data (e.g., HPAI Acc) and 5 bits of the identification value (e.g., ID0). A single 5-bit comparison is performed in the block 206 where the identification value ID0 is compared with the identification value ID1. A result of the comparison is an identification value (ID result)=max(ID1, ID0) with the special values taken into consideration. The ID result may be presented to the blocks 208, 210 and 214.

In the block 208, a selection (e.g., 2x27-bit AND gates) is performed to determine whether the new data has a non-zero value or a zero value. The selection is based on the ID result and the new data. To account for the full overlap region, select logic of the block 208 sign-extends the new data from 17 bits to 27 bits. In the block 210, a selection (e.g., 2x27-bit AND gates) is performed to determine whether the accumulation data has a non-zero value or a zero value. The selection is based on the ID result and the accumulation data. The results of the two selection blocks 208 and 210 are added in the block 212. The addition may be a 27-bit integer adder. The adder may include a carry-in capability for completion of the HPAI bfloat 2's-complement values.

In response to an overflow detection of the 27-bit accumulated data, an overflow signal (e.g., ovf) may be asserted by the block 212 to the block 214. The block 214 responds to the overflow signal assertion by forcing ID result to the special overflow value.

Figure 10:
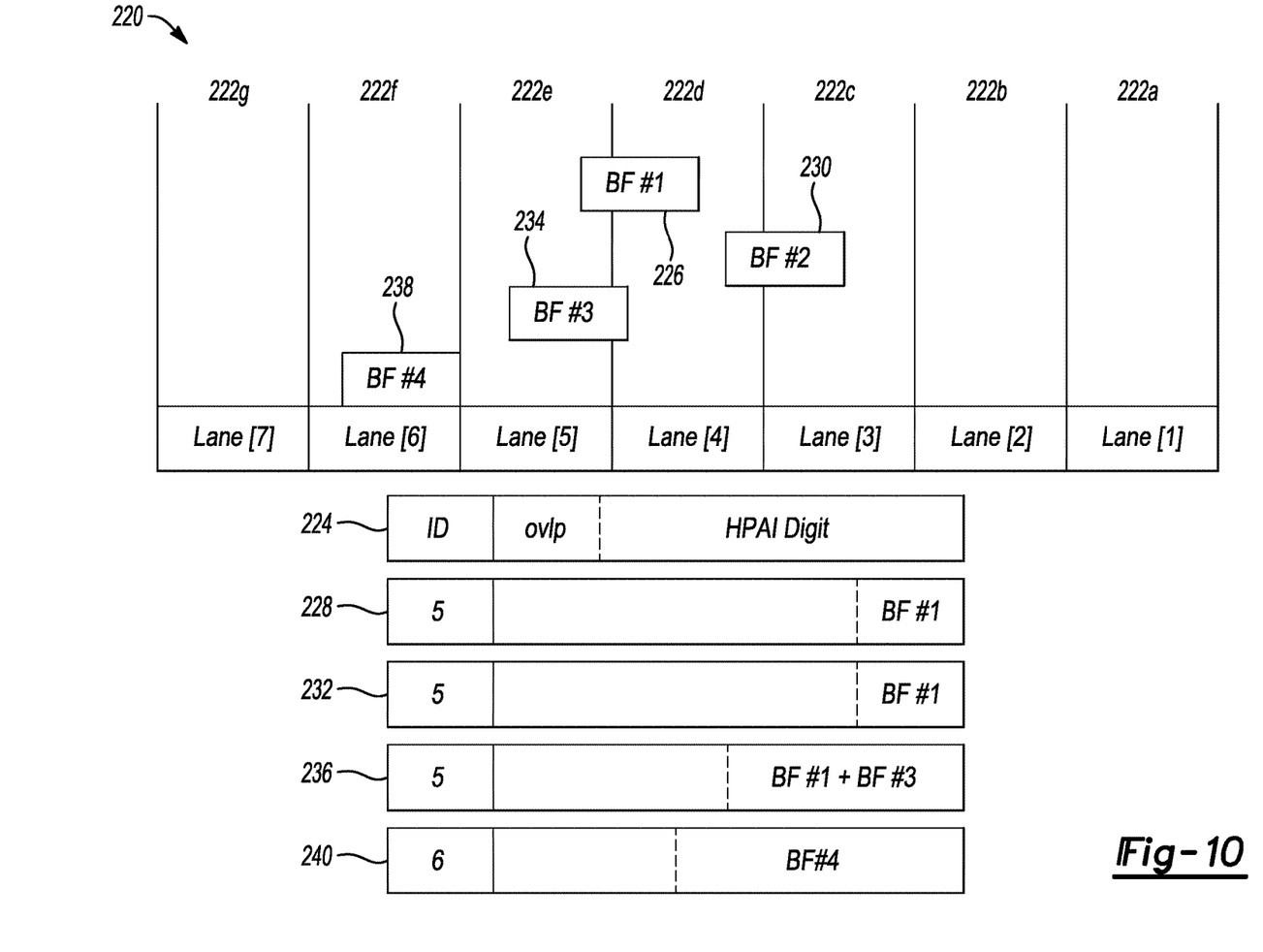
FIG. 10 is a schematic diagram of a multiple-lane HPAI accumulation sequence in accordance with one or more exemplary embodiments.

Referring to FIG. 10, a schematic diagram of an example multiple-lane HPAI accumulation sequence 220 is shown in accordance with one or more exemplary embodiments. The sequence 220 may be implemented in the processor core 100. The sequence 220 includes multiple lanes 222a-222g that accumulates new data into a destination HPAI element 224. The sequence 220 includes a step 226, a step 228, a step 230, a step 232, a step 234, a step 236, a step 238, and a step 240.

During an accumulation addition, if ID(op0)==ID(op1) (e.g., the block 206 in FIG. 9) the HPAI elements are added; else the HPAI element with the larger ID value is utilized. The lane ID (anchor value) of the result value may be updated in the destination HPAI element 224 during the accumulation. For reproducible summations, the lane ID is limited to increasing during the accumulation. Rules for handling special value in the new bfloat16 data may follow the IEEE standard.

Initial new data (e.g., BF #1) may be received by the accumulator in the step 226. BF #1 resides in the lanes 222d and 222e (e.g., lanes 4 and 5). Therefore, the accumulator adds BF #1 to the destination HPAI element 224 in the step 228 with the identification value indicating the highest lane number (e.g., 5). The value of BF #1 may be stored in the data item 130 of the destination HPAI element 224.

A subsequent new data (e.g., BF #2) may be received by the accumulator in the step 230. BF #2 resides in the lanes 222c and 222d (e.g., lanes 3 and 4). During the comparison of the identification values, the accumulator determines that BF #1 is significantly larger than BF #2 and so leaves the result value in the destination HPAI element 224 unchanged in the step 232.

Another new data (e.g., BF #3) is received by the accumulator in the step 234. BF #3 resides in the lanes 222d and 222e (e.g., lanes 4 and 5). During the comparison of the identification values, the accumulator determines that BF #1 and BF #3 have the same magnitude. As such, the accumulator adds BF #3 to BF #1, already stored in the result value, in the step 236. In the example, no overflow occurs due to the addition of BF #3 to BF #1 and so the identification value in the destination HPAI element 224 remains at lane 5.

Another new data (e.g., BF #4) is received at the accumulator in the step 238. BF #4 resides in lane 222f (e.g., lane 6). During the comparison of lane identification values, the accumulator determines that BF #4 has a higher lane identification value (e.g., 6) than the lane identification value of the accumulated data (e.g., 5). Since BF #4 is significantly larger than BF #1+BF #3, the accumulator replaces the result value in the destination HPAI element 224 with BF #4 and automatically updates the identification value to 6 in the step 240. The sequence 220 may continue with the addition of more new data until all of the data has been summed or an overflow occurs. If an overflow occurs, the accumulation operations may continue, however the result would be kept as the special value representing "overflow."

Figure 11:
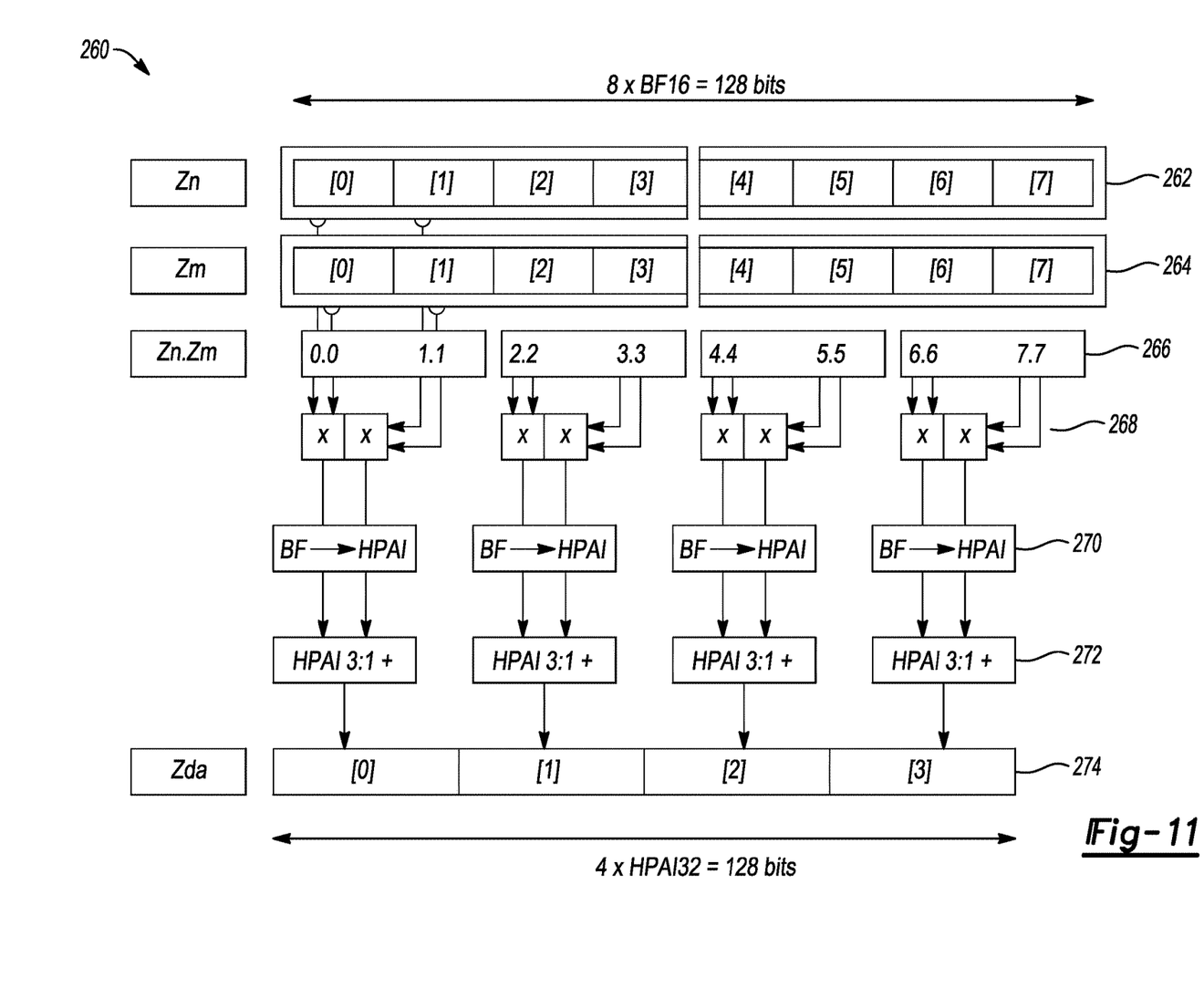
FIG. 11 is a schematic diagram of another accumulator in accordance with one or more exemplary embodiments.

Referring to FIG. 11, a schematic diagram of an example implementation of an accumulator 260 is shown in accordance with one or more exemplary embodiments. The accumulator 260 may be implemented in the processor core 100. The accumulator 260 includes a first vector storage element 262, a second vector storage element 264, product values 266, multiple floating-point multipliers 268, multiple bfloat16 to HPAI conversion units 270, multiple HPAI adders 272 and a result vector storage element 274. The initial values being accumulated may be multiple floating-point values (e.g., multiple bfloat16 values).

Multiple (e.g., 8) initial values are stored in the first vector storage element 262 and multiple (e.g., 8) additional initial values are stored in the second vector storage element 264. Pairs of the initial values from the first vector storage element 262 and the second vector storage element 264 are aligned as the product values 266.

The floating-point multipliers 268 generate multiple first intermediate values by multiplying the initial product values 266. The bfloat16 to HPAI conversion units 270 convert the first intermediate values to multiple second intermediate values. Each of second intermediate values has the format of the anchored-data element 124 (e.g., FIG. 3). The HPAI adders 272 generate a corresponding result values by a 3:1 accumulation of two second intermediate values and a one locally accumulated value. Each result value has the format of the anchored-data element 124. Once the accumulation has completed, the result values may be loaded into the result vector storage element 274.

Figure 12:
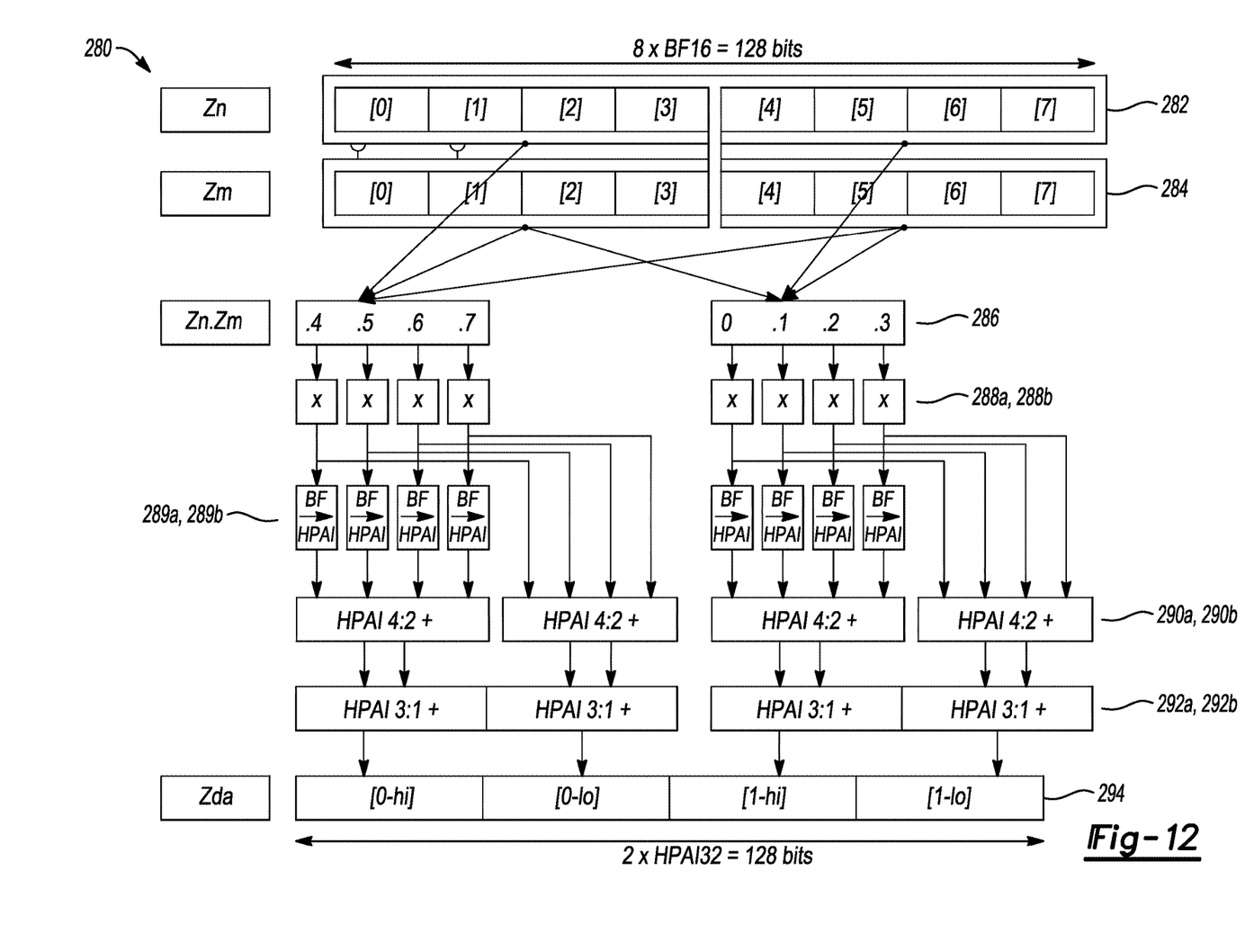
FIG. 12 is a schematic diagram of a 2-lane dot-4 product circuit in accordance with one or more exemplary embodiments.

Referring to FIG. 12, a schematic diagram of an example 2-lane dot-4 product circuit 280 is shown in accordance with one or more exemplary embodiments. The dot-4 product circuit 280 may be implemented in the processor core 100. The dot-4 product circuit 280 includes a first vector storage element 282, a second vector storage element 284, a third vector storage element 286, multiple pairs of floating point multipliers 288a-288b, multiple pairs of bfloat16 to HPAI converters 289a-289b, multiple pairs of HPAI adders 290a-290b, multiple pairs of HPAI accumulators 292a-292b and a result vector storage element 294. The initial values held in the first vector storage element 282 and the second vector storage element 284 may be multiple floating-point values (e.g., multiple bfloat16 values).

The dot-4 product circuit 280 generally calculates a dot-4 product as follows:

$$D[0] \mathrel{+}= (Zn[0]*Zm[0]) + (Zn[1]*Zm[1]) + (Zn[2]*Zm[2]) + (Zn[3]*Zm[3])$$

$$D[1] \mathrel{+}= (Zn[4]*Zm[4]) + (Zn[5]*Zm[5]) + (Zn[6]*Zm[6]) + (Zn[7]*Zm[7])$$

Pairs of the initial values held in the first vector storage element 282 and the second vector storage element 284 are parsed into the third vector storage element 286. The floating point multipliers 288a-288b generate multiple first intermediate values by multiplying a first set of multiple initial values, and generate multiple second intermediate values by multiplying a second set of the initial values. The HPAI conversion circuits 289a-289b subsequently convert the first intermediate values to multiple third intermediate values, and convert the second intermediate values to multiple fourth intermediate values. The third intermediate values and the fourth intermediate values have the format of the anchored-data element 124.

With the data in the anchored-data element format, the HPAI adders 290a generate multiple fifth intermediate values by accumulating a more significant portion of the third intermediate values and the fourth intermediate values. The HPAI adders 290b generate multiple sixth intermediate values by accumulating a less significant portion of the third intermediate values and the fourth intermediate values. The fifth intermediate values and the sixth intermediate value have the format of the anchored-data element 124.

The HPAI accumulators 292a generate multiple first result values by accumulating the fifth intermediate values. The HPAI accumulators 292b generate multiple second result values by accumulating the sixth intermediate values. The first result values and the second result values have the format of the anchored-data element 124. The first result values are loaded in high portions of the result vector storage element 294. The second result values are loaded in low portions of the result vector storage element 294.

The dot-4 product circuit 280 generally resolves an issue dealing with the 32-bit dynamically-scaled HPAI result values comprising only a few significant bits. The two portions of the 64-bit result value comprise two 32-bit HPAI lanes. Furthermore, the result value may use a shared common HPAI lane identification value. The dot-4 product circuit 280 performs approximately 8 multiplications per 128 bits per cycle and so has a similar performance as a comparable bfloat16 dot-4 product circuit, but with more precision and better accuracy in neural network applications.

Figure 13:
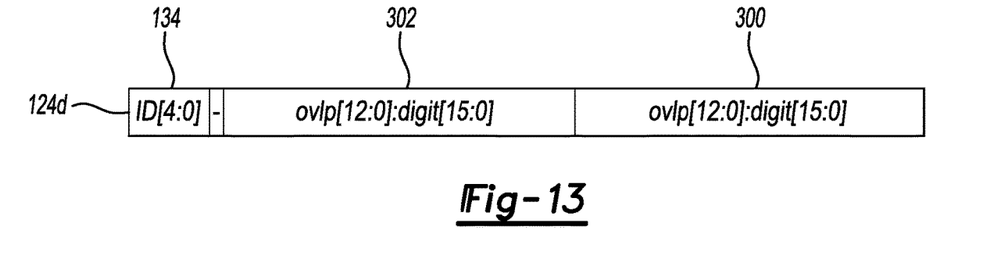
FIG. 13 is a schematic diagram of a first alternative anchored-data element in accordance with one or more exemplary embodiments.

Referring to FIG. 13, a schematic diagram of an example first alternative anchored-data element 124d is shown in accordance with one or more exemplary embodiments. The first alternative anchored-data element 124d includes a single identification item 134 and multiple (e.g., two illustrated) sets 300 and 302 of overlap/data items. Each set 300 and 302 includes one of the overlap items and one of the data items. Each set 300 and 302 provides 39 bits for the data (16 bits) and the corresponding overlap (13 bits). The first alternative anchored-data element 124d provides for a 64-bit 2-lane HPAI element. In response to the identification value incrementing, the lower overlap bits/data bits may be replaced by the upper overlap bits/data bits with the original lower overlap bits/data bits being dropped.

Figure 14:
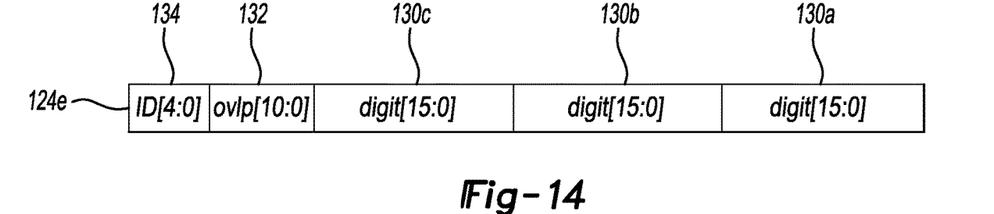
FIG. 14 is a schematic diagram of a second alternative anchored-data element in accordance with one or more exemplary embodiments.

Referring to FIG. 14, a schematic diagram of an example second alternative anchored-data element 124e is shown in accordance with one or more exemplary embodiments. The second alternative anchored-data element 124e includes a single identification item 134, a single overlap item 132 and multiple (e.g., three illustrated) data items 130a-130c. Each data item 130a-130c provides 16 bits of data. The second alternative anchored-data element 124e generally provides a 64-bit 3-lane HPAI element. In response to the identification value incrementing, the overlap bits and the data bits may be right-shifted by 16 bits with the lowest 16 bits being dropped. This scheme removes the reproducibility property of the accumulation in return for retaining a greater number of the result bits.

Figure 15:
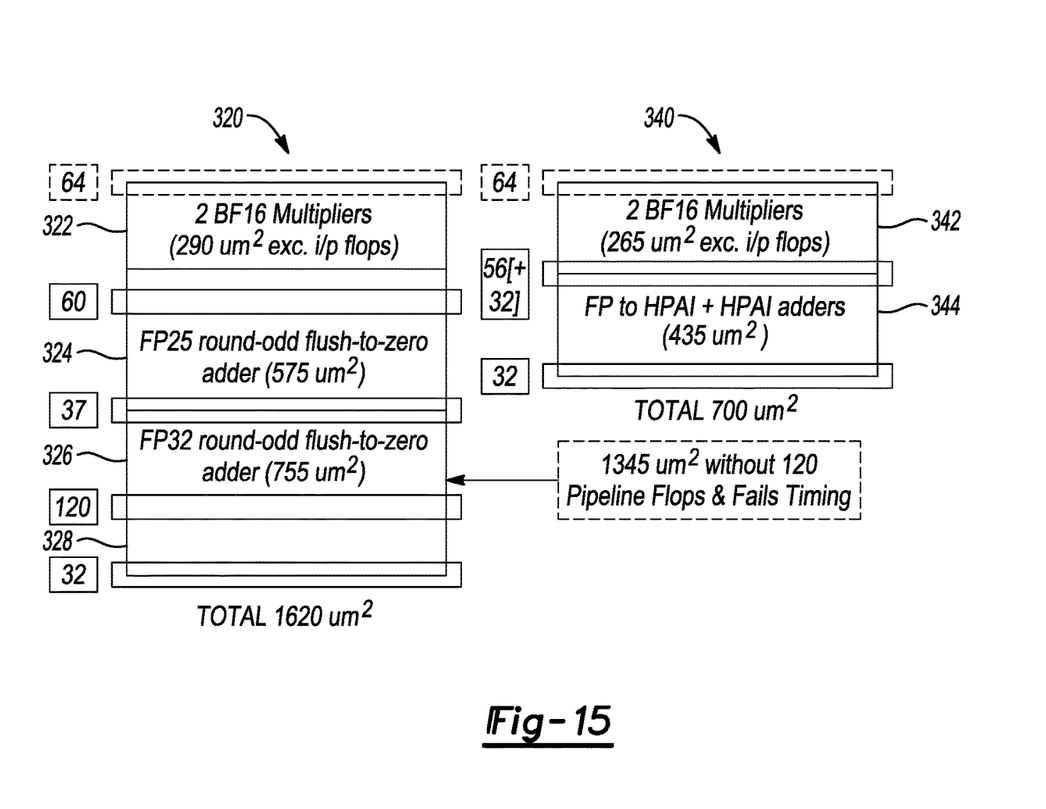
FIG. 15 is a schematic diagram of circuit layout synthesis results of a floating-point dot product circuit and an HPAI dot product circuit in accordance with one or more exemplary embodiments.

Referring to FIG. 15, a schematic diagram of example circuit layout synthesis results of a floating-point dot product circuit 320 and an HPAI dot product circuit 340 is shown in accordance with one or more exemplary embodiments. Inputs for both circuits 320 and 340 are designed to receive bfloat16 values. The floating-point dot product circuit 320 includes a set of 16-bit floating-point multipliers 322, a 25-bit floating-point round-odd flush-to-zero adder 324, a 32-bit floating-point round-odd flush-to-zero adder 326, and additional flops 328. The HPAI dot product circuit 340 includes a set of the 16-bit floating-point multipliers 342, and a floating-point to HPAI convert, adder, and accumulate circuitry 344.

The synthesis results indicate that the HPAI dot product circuit 340 is approximately 2.3 times smaller than the floating-point dot product circuit 320. The HPAI dot product circuit 340 implements single-cycle execution of the bfloat16 to HPAI conversion, sum of products, and accumulation. The bfloat16 multipliers 322 and 342 are essentially the same in both circuit 320 and 340. The HPAI dot product circuit 340 does eliminate a product exponent comparator.

The HPAI accumulate circuitry 344 is approximately 3 times smaller than the 25-bit floating-point/32-bit floating-point adder pairs 324 and 326. In particular, the HPAI accumulate circuitry 344 occupies approximately 54% size of a single fully IEEE-compliant 32-bit floating-point adder (e.g., 808 micrometres squared with 228 flops). The HPAI convert, adder, and accumulate circuitry 344 provides single-cycle execution of the conversion, sum of products, and the accumulation. The accumulate circuitry 344 has a carry-save addition of two bfloat16 products, and lacks pipeline flops in the adders.

The bfloat processing supports the use of "implicit" metadata in the anchored-data elements. For example, 25-bit bfloat products (e.g., 1-bit sign, 8-bit exponential, 16-bit fraction) have a range of $2^{-126}$ to $2^{+127}$. Thus, bfloat processing can accommodate all possible products in a full-width "Kulisch" accumulator: acc[127:−141] =269 bits. The four most significant bits of the bfloat exponent may be used as the lane identification value (or anchor value) embedded within the anchored-data elements 124. The embedded lane identification (anchor) value removes a manual task for a programmer to specify the metadata, and enables 3-register multiply (floating-point)-accumulate (HPAI) instructions.

The anchored-data element format provides for HPAI adders that are significantly smaller than 32-bit floating-point adders and have a lower latency (e.g., fewer pipeline flops). The anchored-data element representation is able to support dot product instructions (multiply-accumulate). Furthermore, HPAI versions of bfloat instructions have been successfully coded up and integrated into TensorFlow (an open-source software library developed by the Google Brain team).

In one or more embodiments of the apparatus, the processing circuit is further configured to generate a result value by accumulating a plurality of the data values in a plurality of the anchored-data elements, and alter the anchor value associated with the result value automatically during the accumulation.

In one or more embodiments of the apparatus, the processing circuit is further configured to generate a plurality of first intermediate values by multiplying a plurality of initial values, convert the plurality of first intermediate values to a plurality of second intermediate values, where each of the plurality of second intermediate values has the format of the anchored-data element, and generate a result value by accumulating the plurality of the second intermediate values. The result value has the format of the anchored-data element.

In one or more embodiments of the apparatus, the plurality of initial values is a plurality of floating-point values.

In one or more embodiments of the apparatus, the processing circuit is further configured to generate a plurality of first intermediate values by multiplying a first set of a plurality of initial values, generate a plurality of second intermediate values by multiplying a second set of the plurality of initial values, convert the plurality of first intermediate values to a plurality of third intermediate values, where each of the plurality of third intermediate values has the format of the anchored-data element, convert the plurality of second intermediate values to a plurality of fourth intermediate values, where each of the plurality of fourth intermediate values has the format of the anchored-data element, generate a plurality of fifth intermediate values by accumulating a more significant portion of the plurality of third intermediate values and the plurality of fourth intermediate values, where each of the plurality of fifth intermediate values has the format of the anchored-data element, generate a plurality of sixth intermediate values by accumulating a less significant portion of the plurality of third intermediate values and the plurality of fourth intermediate values, where each of the plurality of sixth intermediate values has the format of the anchored-data element, generate a first result value by accumulating the plurality of fifth intermediate values where the first result value is the format of the anchored-data element, and generate a second result value by accumulating the plurality of sixth intermediate values, where the second result value is the format of the anchored-data element.

In one or more embodiments of the apparatus, the first set of the plurality of initial values and the second set of the plurality of initial values are a plurality of floating-point values.

In one or more embodiments of the apparatus, the format of the anchored-data element includes a single one of the identification item, a plurality of the overlap items, and a plurality of the data items arranged in a plurality of sets, and each of the plurality of sets includes one of the plurality of overlap items and one of the plurality of data items.

In one or more embodiments of the apparatus, the format of the anchored-data element includes a single one of the identification item, a single one of the overlap item, and a plurality of the data items concatenated with each other.

In one or more embodiments of the apparatus, the processing circuit is further configured to store the identification item, the overlap item, and the data item together in a single addressable location.

In one or more embodiments of the apparatus, the one or more special values includes a positive infinity, a negative infinity, not-a-number, or an overflow.

In one or more embodiments, the method further includes generating a result value by accumulating a plurality of the data values in a plurality of the anchored-data elements, and altering the anchor value associated with the result value automatically during the accumulation.

In one or more embodiments, the method further includes generating a plurality of first intermediate values by multiplying a plurality of initial values, converting the plurality of first intermediate values to a plurality of second intermediate values, where each of the plurality of second intermediate values has the format of the anchored-data element, and generating a result value by accumulating the plurality of the second intermediate values, where the result value has the format of the anchored-data element.

In one or more embodiments, the method further includes generating a plurality of first intermediate values by multiplying a first set of a plurality of initial values, generating a plurality of second intermediate values by multiplying a second set of the plurality of initial values, converting the plurality of first intermediate values to a plurality of third intermediate values, where each of the plurality of third intermediate values has the format of the anchored-data element, converting the plurality of second intermediate values to a plurality of fourth intermediate values, where each of the plurality of fourth intermediate values has the format of the anchored-data element, generating a plurality of fifth intermediate values by accumulating a more significant portion of the plurality of third intermediate values and the plurality of fourth intermediate values, where each of the plurality of fifth intermediate values has the format of the anchored-data element, generating a plurality of sixth intermediate values by accumulating a less significant portion of the plurality of third intermediate values and the plurality of fourth intermediate values, where each of the plurality of sixth intermediate values has the format of the anchored-data element, generating a first result value by accumulating the plurality of fifth intermediate values where the first result value is the format of the anchored-data element, and generating a second result value by accumulating the plurality of sixth intermediate values, where the second result value is the format of the anchored-data element.

In one or more embodiments of the method, the format of the anchored-data element includes a single one of the identification item, a plurality of the overlap items, and a plurality of the data items arranged in a plurality of sets, and each of the plurality of sets includes one of the plurality of overlap items and one of the plurality of data items.

In one or more embodiments of the method, the format of the anchored-data element includes a single one of the identification item, a single one of the overlap item, and a plurality of the data items concatenated with each other.

In one or more embodiments, the method further includes storing the identification item, the overlap item, and the data item together in a single addressable location.

In one or more embodiments of the non-transitory computer readable storage medium, the plurality of operations further includes generating a result value by accumulating a plurality of the data values in a plurality of the anchored-data elements, and altering the anchor value associated with the result value automatically during the accumulation.

In one or more embodiments of the non-transitory computer readable storage medium, the plurality of operations further includes generating a plurality of first intermediate values by multiplying a plurality of initial values, converting the plurality of first intermediate values to a plurality of second intermediate values, where each of the plurality of second intermediate values has the format of the anchored-data element, and generating a result value by accumulating the plurality of the second intermediate values, where the result value has the format of the anchored-data element.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus comprising:
 a processing circuit configured to perform one or more processing operations in response to one or more instructions to generate a plurality of anchored-data elements, generate a result value by accumulating a plurality of respective data values in the plurality of anchored-data elements, and alter a lane identification value for the result value automatically during the accumulation; and
 a storage device configured to store each respective anchored-data element of the plurality of anchored-data elements in a respective single register, wherein:
  a format of each respective anchored-data element of the plurality of anchored-data elements includes an identification item, an overlap item, and a data item;
  the data item is configured to hold the respective data value of the respective anchored-data element of the plurality of anchored-data elements;
  the identification item includes a lane item and a special item; and
  the special items indicates that the lane item contains one of (i) the lane identification value and (ii) one of a plurality of special values; and
 wherein the result value has the format of the plurality of anchored-data elements.

2. The apparatus according to claim 1, wherein the processing circuit is further configured to:
 generate a plurality of first intermediate values by multiplying a plurality of initial values;
 convert the plurality of first intermediate values to a plurality of second intermediate values, wherein each of the plurality of second intermediate values has the format of the plurality of anchored-data elements; and
 generate the result value by accumulating the plurality of the second intermediate values.

3. The apparatus according to claim 2, wherein the plurality of initial values is a plurality of floating-point values.

4. The apparatus according to claim 1, wherein the processing circuit is further configured to:
 generate a plurality of first intermediate values by multiplying a first set of a plurality of initial values;
 generate a plurality of second intermediate values by multiplying a second set of the plurality of initial values;

convert the plurality of first intermediate values to a plurality of third intermediate values, wherein each of the plurality of third intermediate values has the format of the plurality of anchored-data elements; and convert the plurality of second intermediate values to a plurality of fourth intermediate values, wherein each of the plurality of fourth intermediate values has the format of the plurality of anchored-data elements.

5. The apparatus according to claim 4, wherein the first set of the plurality of initial values and the second set of the plurality of initial values are a plurality of floating-point values.

6. The apparatus according to claim 4, wherein the processing circuit is further configured to:

generate a plurality of fifth intermediate values by accumulating a more significant portion of the plurality of third intermediate values and the plurality of fourth intermediate values, wherein each of the plurality of fifth intermediate values has the format of the plurality of anchored-data elements;

generate a plurality of sixth intermediate values by accumulating a less significant portion of the plurality of third intermediate values and the plurality of fourth intermediate values, wherein each of the plurality of sixth intermediate values has the format of the plurality of anchored-data elements;

generate a first result value by accumulating the plurality of fifth intermediate values, wherein the first result value has the format of the plurality of anchored-data elements; and generate a second result value by accumulating the plurality of sixth intermediate values, wherein the second result value has the format of the plurality of anchored-data elements.

7. The apparatus according to claim 1, wherein the format of the plurality of anchored-data elements includes a single one of the identification item, a plurality of the overlap items, and a plurality of the data items arranged in a plurality of sets, and each of the plurality of sets includes one of the plurality of the overlap items and one of the plurality of the data items.

8. The apparatus according to claim 1, wherein the format of the plurality of anchored-data elements includes a single one of the identification item, a single one of the overlap item, and a plurality of the data items concatenated with each other.

9. The apparatus according to claim 1, wherein the one or more special values includes a positive infinity, a negative infinity, not-a-number, or an overflow.

10. A method of controlling data processing, comprising:

controlling a processing circuit to perform one or more processing operations in response to one or more instructions to generate a plurality of anchored-data elements;

generating a result value by accumulating a plurality of respective data values in the plurality of the anchored-data elements;

altering a lane identification value for the result value automatically during the accumulation; and storing each respective anchored-data element of the plurality of anchored-data elements in a respective single register, wherein:

a format of each respective anchored-data element of the plurality of anchored-data elements includes an identification item, an overlap item, and a data item;

the data item is configured to hold the respective data value of the respective anchored-data element of the plurality of anchored-data elements;

the identification item includes a lane item and a special item; and the special items indicates that the lane item contains one of (i) the lane identification value and (ii) one of a plurality special values; and wherein the result value has the format of the plurality of anchored-data elements.

11. The method according to claim 10, further comprising:

generating a plurality of first intermediate values by multiplying a plurality of initial values;

converting the plurality of first intermediate values to a plurality of second intermediate values, wherein each of the plurality of second intermediate values has the format of the plurality of anchored-data elements; and generating the result value by accumulating the plurality of the second intermediate values.

12. The method according to claim 10, further comprising:

generating a plurality of first intermediate values by multiplying a first set of a plurality of initial values;

generating a plurality of second intermediate values by multiplying a second set of the plurality of initial values;

converting the plurality of first intermediate values to a plurality of third intermediate values, wherein each of the plurality of third intermediate values has the format of the plurality of anchored-data elements; and converting the plurality of second intermediate values to a plurality of fourth intermediate values, wherein each of the plurality of fourth intermediate values has the format of the plurality of anchored-data elements.

13. The method according to claim 12, further comprising:

generating a plurality of fifth intermediate values by accumulating a more significant portion of the plurality of third intermediate values and the plurality of fourth intermediate values, wherein each of the plurality of fifth intermediate values has the format of the plurality of anchored-data elements;

generating a plurality of sixth intermediate values by accumulating a less significant portion of the plurality of third intermediate values and the plurality of fourth intermediate values, wherein each of the plurality of sixth intermediate values has the format of the plurality of anchored-data elements;

generating a first result value by accumulating the plurality of fifth intermediate values wherein the first result value has the format of the plurality of anchored-data elements; and generating a second result value by accumulating the plurality of sixth intermediate values, wherein the second result value has the format of the plurality of anchored-data elements.

14. The method according to claim 10, wherein the format of the plurality of anchored-data elements includes a single one of the identification item, a plurality of the overlap items, and a plurality of the data items arranged in a plurality of sets, and each of the plurality of sets includes one of the plurality of the overlap items and one of the plurality of the data items.

15. The method according to claim 10, wherein the format of the plurality of anchored-data elements includes a single one of the identification item, a single one of the overlap item, and a plurality of the data items concatenated with each other.

16. A non-transitory computer readable storage medium storing instructions that control data processing, the instructions, when executed by a processor cause the processor to perform a plurality of operations comprising:
controlling a processing circuit to perform one or more processing operations in response to the instructions to generate a plurality of anchored-data elements;
generating a result value by accumulating a plurality of respective data values in the plurality of the anchored-data elements;
altering a lane identification value for the result value automatically during the accumulation; and
storing each respective anchored-data element of the plurality of anchored-data elements in a respective single register, wherein:
a format of each respective anchored-data element of the plurality of anchored-data elements includes an identification item, an overlap item, and a data item;
the data item is configured to hold a data value of the respective anchored-data element of the plurality of anchored-data elements;
the identification item includes a lane indication item and a special item; and
the special item indicates that the lane item contains one of (i) the lane identification value and (ii) one of a plurality special values; and
wherein the result value has the format of the plurality of anchored-data elements.

17. The non-transitory computer readable storage medium according to claim 16, wherein the plurality of operations further comprises:
generating a plurality of first intermediate values by multiplying a plurality of initial values;
converting the plurality of first intermediate values to a plurality of second intermediate values, wherein each of the plurality of second intermediate values has the format of the plurality of anchored-data elements; and
generating the result value by accumulating the plurality of the second intermediate values.

18. The non-transitory computer readable storage medium according to claim 16, wherein the plurality of operations further comprises:
generating a plurality of first intermediate values by multiplying a first set of a plurality of initial values;
generating a plurality of second intermediate values by multiplying a second set of the plurality of initial values;
converting the plurality of first intermediate values to a plurality of third intermediate values, wherein each of the plurality of third intermediate values has the format of the plurality of anchored-data elements; and
converting the plurality of second intermediate values to a plurality of fourth intermediate values, wherein each of the plurality of fourth intermediate values has the format of the plurality of anchored-data elements.

19. The non-transitory computer readable storage medium according to claim 16, wherein the format of the plurality of anchored-data elements includes a single one of the identification item, a plurality of the overlap items, and a plurality of the data items arranged in a plurality of sets, and each of the plurality of sets includes one of the plurality of the overlap items and one of the plurality of the data items.

20. The non-transitory computer readable storage medium according to claim 16, wherein the format of the plurality of anchored-data elements includes a single one of the identification item, a single one of the overlap item, and a plurality of the data items concatenated with each other.

* * * * *